United States Patent [19]
Gerber

[11] 3,747,454
[45] July 24, 1973

[54] APPARATUS FOR CUTTING SHEET MATERIAL

[75] Inventor: Heinz Joseph Gerber, West Hartford, Conn.

[73] Assignee: Gerber Garment Technology, Incorporated, East Hartford, Conn.

[22] Filed: June 24, 1971

[21] Appl. No.: 156,421

[52] U.S. Cl.................. 83/375, 83/374, 83/451, 83/747, 83/925 CC
[51] Int. Cl. .................................... B26d 7/02
[58] Field of Search ............... 83/925 CC, 17, 20, 83/21, 29, 176, 375, 374, 701, 451, 747; 30/275

[56] References Cited
UNITED STATES PATENTS

| 3,470,780 | 10/1969 | Wright | 83/925 CC |
| 3,495,492 | 2/1970 | Gerber et al. | 83/925 CC |
| 3,589,225 | 6/1971 | Wiatt | 83/925 CC |
| 2,052,630 | 9/1936 | Hoskwith | 30/275 X |
| 2,200,746 | 5/1940 | Hoskwith | 30/275 |

*Primary Examiner*—J. M. Meister
*Attorney*—Roger B. McCormick, John C. Linderman et al.

[57] ABSTRACT

Apparatus which translates a cutting blade along a cutting path through a layup of sheet material on a support table includes a tamping member which follows the cutting blade along the cutting path. The tamping member is driven in a reciprocating or vibratory manner to return the upper plies of the layup at opposite lateral sides of a cut to their original, flattened position from the peaked positions acquired during the cutting operations. With the plies in the flattened position, a subsequent crossing of a previously cut segment of the cutting path is more easily accomplished without further lifting or dislocating the upper plies.

11 Claims, 6 Drawing Figures

PATENTED JUL 24 1973 3,747,454

APPARATUS FOR CUTTING SHEET MATERIAL

BACKGROUND OF THE INVENTION

This invention relates to the field of cutting machines and, more particularly, is concerned with automated cutting machines which cut pattern pieces from multiply layups of sheet material by means of a computer-controlled knife blade.

The use of computer-controlled cutting blades for cutting layups of sheet material is already well known in the art as indicated by U.S. Pat. No. 3,548,697 entitled "Apparatus For Cutting Sheet Material" issued Dec. 22, 1970 to the assignee of the present invention. Cutting apparatus of this type is frequently employed for cutting pattern pieces from muliti-ply layups of sheet material by moving a support table on which a layup is spread and a cutting blade relative to one another by means of a control computer which causes the cutting blade to translate along a pre-programmed cutting path through the layup. In cutting apparatus of this type it is necessary that the plies of the layup be held in a fixed position on the support table throughout the cutting operation and that the upper plies, in particular, be held in a flattened condition so that a cutting blade can glide over a previously cut segment of the cutting path without gathering, pushing or otherwise dislocating the individual plies. Even though a cutting blade may be very sharp, there is generally a tendency, particularly with reciprocating cutting blades, to lift and push the upper plies of the layup which are not pressed firmly against the lower plies.

It is customary to utilize a presser foot surrounding a cutting blade to prevent the sheet material of the layup from lifting while the blade moves relative to the presser foot in the cutting operation. With certain materials and particularly with a reciprocating cutting blade, the upper plies of a layup tend to become peaked at each side of the cutting path as the cutting blade passes. If a presser foot and cutting blade subsequently cross over such peaked plies, there is a greater tendency for the plies to be pushed rather than to slide smoothly under the presser foot to the cutting blade. As a result, the upper plies may be dislocated and form wrinkles which prevent pattern pieces from being accurately cut from the upper plies.

A crossing of a previous cut is generally encountered at least once in each cutting operation circumscribing a single pattern piece where the end of the cutting path intersects the beginning of the cutting path. The problem of crossing a previous cut is also encountered at sharp corners in a cutting path where it is frequently necessary to overrun the corner with the cutting blade, lift the cutting blade out of the layup, rotate the cutting blade into the new cutting direction and lower the blade again into the layup before intersecting the previously cut segment of the cutting path at the corner and proceeding along the cutting path in the new direction.

It is accordingly a general object of the present invention to disclose a cutting apparatus in which the upper plies of the layup adjacent a previous cut are returned to their original, flattened position so that a subsequent crossing of the cutting path does not result in a dislocation of the sheet material.

SUMMARY OF THE INVENTION

The present invention resides in a cutting apparatus which is employed for cutting pattern pieces from a layup of sheet material. The apparatus comprises supporting means having a support surface for holding the layup of sheet material in a spread condition while it is being cut. A carriage means is suspended over the support surface of the supporting means and is translatable relative to the support surface in a direction generally parallel to the latter. A cutting blade is carried by the carriage means and is translatable with the latter relative to the support surface in cutting engagement with a layup of sheet material on the support surface. A controlled motor means connected between the supporting means and the carriage means controllably translates the carriage means and supporting means relative to one another to cause the cutting blade to follow a predefined cutting path through the layup. A tamping means suspended from the carriage means adjacent the cutting blade is translatable with the carriage means relative to the layup and operates to flatten the layup material along the path followed by the blade. With the upper plies flattened, a subsequent crossing of the cutting path by the cutting blade is accomplished without dislocating or wrinkling the upper plies of the layup and results in the pattern pieces cut from the upper plies being identical to those cut from the lower plies of the layup.

DESCRIPTION OF THE PREFERRED EMBODIMENTS

Figure 1:
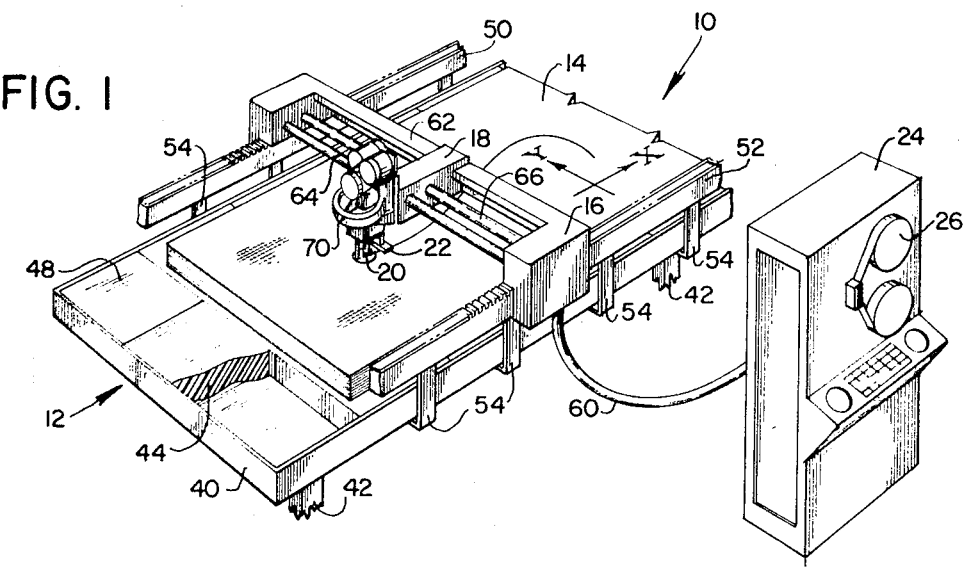
FIG. 1 is a perspective view of a cutting apparatus embodying the present invention.

FIG. 1 shows the general components of a computer controlled cutting apparatus embodying the present invention. The apparatus may be used for cutting pattern pieces from various types of sheet materials such as woven and nonwoven fabrics, and plastics. The principal components of the apparatus, generally designated 10, include a support table 12 on which a layup 14 of sheet material is supported in a spread condition, a two-axis carriage mechanism composed of an X carriage 16 which moves back and forth relative to the table 12 in the indicated X coordinate direction and a Y carriage 18 which is mounted on the X carriage 16 and translates relative to the X carriage 16 and the table 12 in the indicated Y coordinate direction, a reciprocating cutting blade 20 and a tamping member 22, both of which are suspended from the Y carriage 18 for translation over the layup 14. The signals controlling the translational movements of the carriages 16 and 18 and all control signals regulating the operation of the blade 20 and tamping member 22 are supplied from a digital control computer 24 which reads a cutting program from an appropriate memory device such as the magnetic memory tape 26.

The support table 12 is comprised of a frame 40 having table legs 42 and a penetrable bed 44 defining a work surface 48 parallel to the X and Y directions and on which the layup 14 of sheet material is held in a spread condition. The penetrable bed 44 may be composed of, for example, a plurality of blocks of foamed plastic or bristled mats which are suitable for defining the work surface 48 and which at the same time permit the reciprocating cutting blade 20 to penetrate through the layup of sheet material into the bed without damaging the blade. To hold the layup 14 in position on the work surface 48, the table 12 may take the form of the vacuum table shown in U. S. Pat. No. 3,495,492 entitled "Apparatus for Working on Sheet Material" issued February 17, 1970 to the assignee of the present invention.

The X carriage 16 is supported on two racks 50 and 52 which in turn are supported from the table 12 by a plurality of brackets 54 at opposite longitudinal sides of the table 12. The racks 50 and 52 and the table 12, although broken away at one end, are generally coextensive so that the X carriage 16 can translate the cutting blade 20 parallel to the work surface 48 over the full extent of the surface 48 on which a layup 14 may be positioned. Two motor-driven pinions (not shown) are carried within the X carriage 16 and engage the racks 50 and 52 respectively to translate the X carriage 16 over the table 12. The movements of the X carriage are controlled by motor commands transmitted from the computer 24 through a command cable 60 to the pinion motors.

The Y carriage 18 is mounted on a support beam 62 of the X carriage 16 and a guide rail 64, each of which extend transversely across the table 12 between the lateral sides of the carriage 16. A lead screw 66 also extending between the lateral sides of the carriage 16 parallel to the guide rail 64 threadably engages the Y carriage 18 and is rotated by a drive motor (not shown) within the X carriage 16 to cause the carriage 18 to move transversely of the table 12 on the X carrige 16 in response to motor commands transmitted from the computer 24 through the command cable 60. The combined movements of both the X carriage 16 and the Y carriage 18 enable the cutting blade 20 to be translated to any portion of the work surface 48 of table 12 along the mutually perpendicular X and Y coordinate axes and, with appropriate command signals from the tape 26, the carriages can translate the blade 20 along a predefined cutting path through the layup 14.

Figure 2:
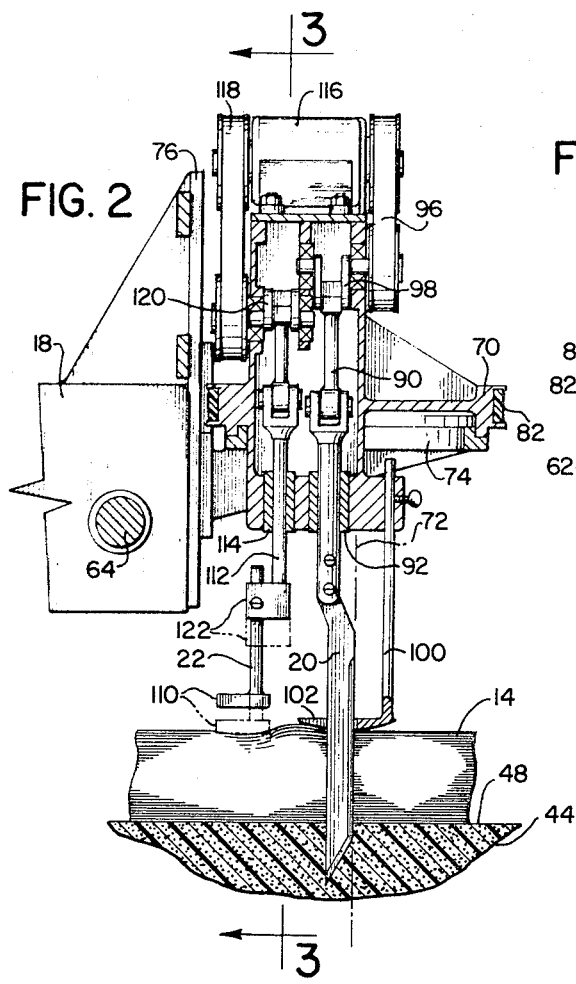
FIG. 2 is a side elevation view of the cutting components in FIG. 1 and shows one embodiment of the tamping mechanism.
Figure 3:
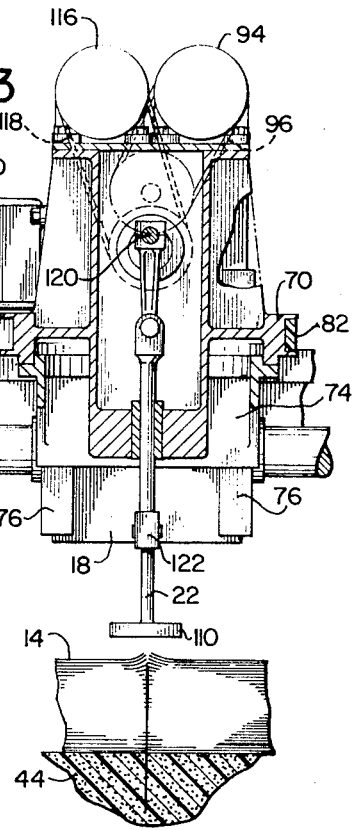
FIG. 3 is a front elevation view of the tamping mechanism as seen along the sectioning line 3—3 in FIG. 2.

FIGS. 2 and 3 show the detailed construction of the cutting and tamping mechanisms according to one embodiment of the present invention. As seen most clearly in FIG. 2, the cutting blade 20 is a pointed, reciprocating knife blade which is supported on a rotatable support platform 70 having an axis 72 of rotation which is perpendicular to the work surface 48 of the penetrable bed 44. A rotary blade, however, can also be utilized in the present invention if desired. The leading edge of the cutting blade 20, that is, the edge which is advanced through the layup 14, is a sharpened knife edge and extends substantially colinearly with the axis 72 of rotation. The rotatable platform 70 is supported at the projecting end of the Y carriage 18 on an adjustable support bracket 74 which can be adjusted vertically relative to the work surface 48 on reinforced guide ways 76 by means of a motor (not shown). The vertical adjustment of the bracket 74, and therefore the platform 70, permits the cutting blade 20 and tamping member 22 to be lifted away from the work surface 48 and out of engagement with the layup 14 at the beginning and end of a cutting operation and also during a cutting operation when necessary.

The platform 70 is rotated about the axis 72 by means of a rotational drive motor 80 and a toothed drive belt 82 which extends around a segment of the platform 70 and a drive pulley 84 on the drive shaft of the motor 80. The drive motor 80 is mounted on the adjustable support bracket 74 and receives rotation commands through the cable 60 from the computer 24 to cause the cutting blade 20 to be oriented in the appropriate direction tangent to the cutting path at each point on the periphery of a pattern piece being cut.

The cutting blade 20 is suspended from the rotatable support platform 70 by means of a reciprocating drive linkage 90 which is guided by a sleeve bearing 92 and reciprocated by means of a drive motor 94, toothed drive belt and pulleys 96 and a crankshaft 98 mounted at the upper side of the platform 70. The drive motor 94 and hence the reciprocation of the cutting blade 20 are actuated and controlled by commands from the computer 24 through the cable 60. A presser foot 100 containing a slot 102 through which the cutting blade 20 reciprocates surrounds the cutting blade to smooth the upper plies of the layup 14 and to prevent the upper plies from lifting during the upward stroke of the blade 20. The presser foot 100 is mounted in the rotatable platform for vertical adjustment so that the lower side of the foot can be made to rest against layups of various thicknesses on the work surface 48.

Figure 4:
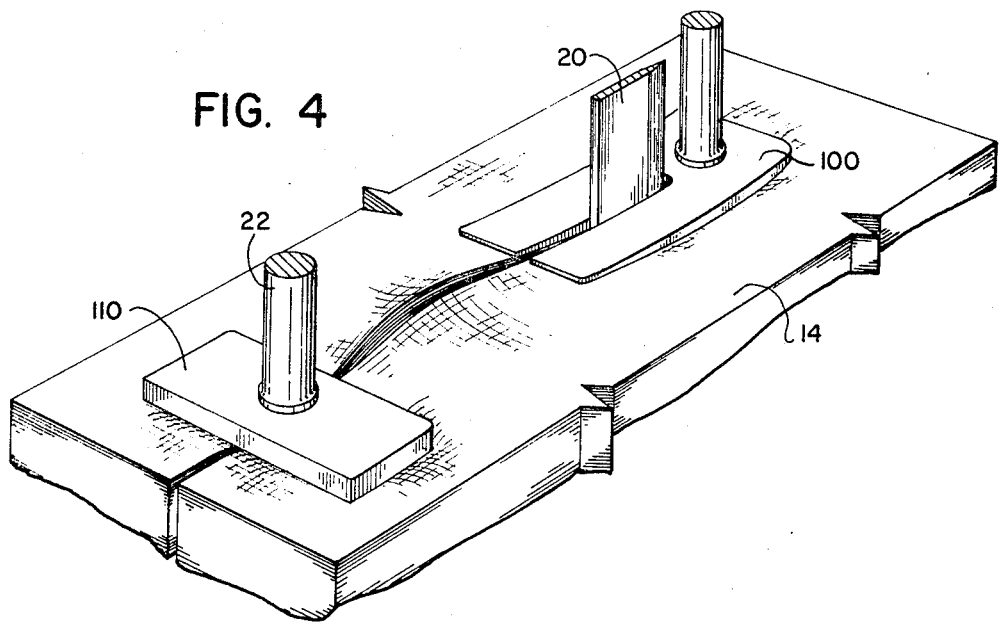
FIG. 4 is an enlarged perspective view of the tamping member and cutting blade shown operating on a fragmentary portion of a layup.

Even though the presser foot 100 assists in holding the upper plies of the layup 14 in position as the knife 20 reciprocates, the abutting edges of the cut sheet material, particularly with certain fabrics, tend to be lifted during the cutting operation to produce a peaked condition in the upper plies of the layup as shown most clearly in FIGS. 3 and 4. Such peaked condition of the upper plies can interfere with subsequent cutting operations where the cutting path is again crossed at an angle by the cutting blade 20 to either cut a sharp corner or to complete a cut around the periphery of a pattern piece at the point where beginning and end of the cutting path meet. With the peaked condition, the presser foot or the cutting blade may push the upper plies of the layup as described above and thereby dislocate the upper plies which prevents a pattern from being accurately cut from the layup.

In order to obviate the undesirable problems associated with the peaked condition of the upper plies of the layup, the tamper member 22 is provided to tract the cutting blade 20 and flatten or compact the upper plies following the cutting operation. In the embodiment of the invention shown in FIGS. 2 and 3, the tamper member 22 comprises a reciprocating pad 110 having a generally flat bottom or contact surface and is suspended from the rotatable platform 70 immediately adjacent the trailing edge of the cutting blade 20 by means of a reciprocating drive linkage 112 guided in a sleeve bearing 114. The reciprocation of the pad 110 between the solid line and phantom positions shown in FIG. 2 is generated by a drive motor 116, toothed drive belt and pulleys 118, and a crankshaft 120 to which the upper end of the reciprocating linkage 112 is connected. The drive motor 116 for the tamper member 22 and the drive motor 94 for the cutting blade 20 are turned on and off by the computer 24 at the same time so that the cutting and tamping operations occur simultaneously.

With the tamper member 22 suspended from the rotatable platform 70 at the trailing edge of the cutting blade 20, the pad 110 tracts the cutting blade and flattens the peaked upper plies of the layup 14 as shown in FIGS. 2 and 4. The tamper member 22 is mounted in an adjustable clamp 122 at the depending end of the reciprocating linkage 112 so that the amount of pressure on or compaction of the layup can be adjusted with variations in the vertical thickness of the layup 14 and variations in the type of sheet material being cut. As seen in FIG. 2, the lower position of the pad 110 shown in phantom is slightly below that of the presser foot 100 to obtain a slight compression of the material and to ensure a complete return of the upper plies to the original, flattened position.

With the separate drive motors 94 and 116 and reciprocating drive linkages 90 and 112 for the cutting blade 20 and tamper member 22 respectively, the member 22 can be reciprocated at a speed and stroke which is different from that of the blade 20. The capability of utilizing different speeds and strokes is desirable since it is preferable to oscillate the tamper member at a higher speed and smaller stroke than that of the knife blade. The higher cyclic speed for the tamper member results in more frequent make-and-break contacts with the layup 14 and less tendency to drag the upper plies of the layup with the pad 110. Also, to utilize to the fullest extent possible the entire length of the sharpened cutting edge on blade 20 , a longer reciprocating stroke than that needed to lift the pad 110 out of engagement with the layup 14 is generally preferable for the blade 20.

Figure 5:
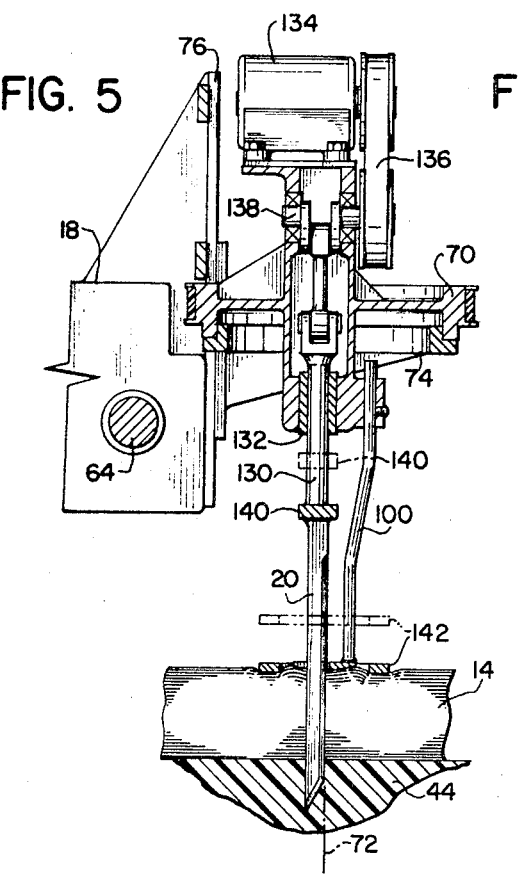
FIG. 5 is a side elevation view of the cutting components and the tamping mechanism in an alternate embodiment of the invention.
Figure 6:
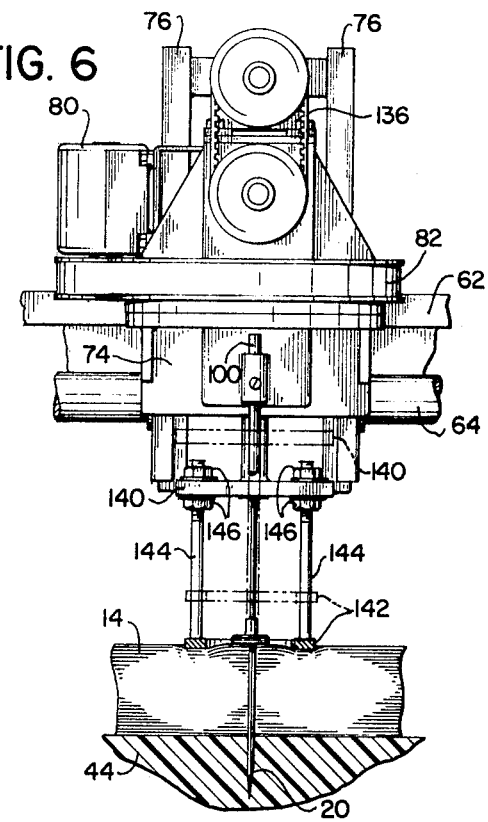
FIG. 6 is a front elevation view of the cutting components and tamping mechanism shown in FIG. 5.

Although it is desirable to have separate drive trains for both the cutting blade 20 and tamper member 22, it is also possible to utilize the same drive train for both as shown in the alternate embodiment of the invention in FIGS. 5 and 6. Elements having corresponding elements in FIGS. 1, 2 and 3 bear the same reference numerals in FIGS. 5 and 6. The reciprocating cutting blade 20 is suspended from the rotatable table 70 by means of a reciprocating drive linkage 130 which is supported in a bearing sleeve 132. The linkage 130 is reciprocated by means of a drive motor 134, toothed drive belt and pulleys 136 and a crankshaft 138 to which the upper end of the linkage 130 is connected. At the lower extremity of th linkage 130 adjacent the connection with the cutting blade 20, a transverse cross bar 140 is secured. The cross bar 140 serves as a mount for an annular tamping member 142 having an annular contact surface which circumscribes the axis of rotation and the cutting blade 20. The annular member 142 is suspended from the bar 140 by a pair of adjustable rods 144 and locking bolts 146. The rods 144 and bolts 146 permit the annular tamping member to be adjusted vertically relative to the layups 14 in a manner similar to the adjustable clamp 122 in FIGS. 2 and 3 so that adjustment for layups of different materials and thicknesses can be made.

It will be readily understood that the reciprocating linkage 130 moves both the cutting blade 20 and the tamper member 142 up and down at the same speed and with the same stroke, the upper and lower limits of the stroke being indicated in phantom. The annular tamping member 142 circumscribing the cutting blade 20 assures that the layup 14 is flattened or compacted at all points surrounding the blade so that regardless of any turns or bends in the cutting path encountered by the translating cutting blade, any previously cut segments of the cutting path are flattened before the cutting blade reaches such segments as well as after the cutting blade traverses the segments. Effectively, therefore, each cut region of the layup is twice subjected to the tamping action to insure that the upper plies of the layup are pressed downwardly into a flat position.

While the present invention has been described in several preferred embodiments, it should be understood that still further substitutions and modifications can be had without departing from the spirit of the invention. For example, the annular tamping member 142 need not be suspended from the rotatable platform 70 but instead may be suspended directly from the bracket 74 and oscillated or vibrated by a separate drive motor mounted to the bracket 74. Although the reciprocating motion in each of the disclosed embodiments is produced by a rotating crankshaft and drive linkage, an electrical or mechanical vibrator can be used to produce the small amplitude, high frequency vibrations of the tamping member. Accordingly, the present invention has been described in several preferred embodiments merely by way of illustration rather than limitation.

I claim:

1. Apparatus for cutting pattern pieces from a layup of sheet material comprising: supporting means having a support surface for holding the layup of sheet material in a spread condition; carriage means suspended over said support surface and translatable relative thereto in a direction generally parallel to said support surface; a cutting blade carried by said carriage means and translatable with said carriage means relative to said supporting surface in cutting engagement with a layup thereon; controlled motor means connected between said supporting means and said carriage means for controllably translating said carriage means and said supporting means relative to one another to cause said cutting blade to follow a predefined cutting path through a layup on said support surface; a presser foot having a blade slot and suspended from the carriage means adjacent the cutting blade with the cutting blade passing through the slot; and tamping means suspended from said carriage means adjacent said presser foot and cutting blade and translatable with said carriage means relative to said supporting surface and a layup supported thereon for flattening the material of said layup along the path followed by said presser foot and cutting blade.

2. Apparatus for cutting pattern pieces defined in claim 1 wherein said tamping means comprises a pad member having a generally flat contact surface and first drive means connected to the pad member for cyclically pressing said contact surface of said pad member against a layup.

3. Apparatus as defined in claim 2 wherein said cutting blade is a reciprocating cutting blade having a trailing edge and a sharp leading cutting edge, said leading edge being advanced along said predefined cutting path by the controlled motor means; and said pad member is suspended from said carriage means with at least one portion of said contact surface located adjacent said presser foot and behind the trailing edge of said cutting blade.

4. Apparatus as defined in claim 3 wherein said first drive means comprises a reciprocating drive means mounted to said carriage means; and said reciprocating cutting blade and said pad members are both connected to said first drive means for simultaneous reciprocating operation along said cutting path.

5. Apparatus as defined in claim 3 wherein second drive means are mounted on said carriage means and connected to said reciprocating cutting blade for reciprocating said cutting blade in a cutting motion through a layup on said supporting means.

6. Apparatus for cutting pattern pieces from a multiply layup of sheet material, said apparatus comprising: a support table having a penetrable bed defining a work surface on which a layup of sheet material may be positioned in a spread condition; cutting means; translatable means connected between said cutting means and said support table for translating said cutting means and said support table relative to one another along mutually perpendicular directions parallel to said work surface; control means connected to said translatable means for controlling the translations of said cutting means and said support table relative to one another to move said cutting means along a cutting path on said layup; a presser foot suspended from the translatable means for translation with the cutting means and for adjustment relative to the work surface of the penetrable bed and sheet material spread thereon, the presser foor having an opening within its periphery in which the cutting means is received during a cutting operation; and tamping means connected with said translatable means for translation with said cutting means along said cutting path on the layup, said tamping means including a tamping pad supported from the translatable means in the vicinity of the presser foot and having a tamping surface facing toward the work surface of the penetrable bed in a region lying outside of the periphery of the presser foot and spaced from the presser foot and cutting means for tamping the sheet material of the layup into a flattened position during a cutting operation.

7. Apparatus for cutting pattern pieces as defined in claim 6 wherein; said translatable means comprises a supporting beam overlying said support table and a support platform rotatable with respect to said support beam about an axis of rotation perpendicular to said work surface of said support table; said cutting means comprises a reciprocating knife blade having a trailing edge and a sharpened leading edge suspended from said rotatable support platform with said leading edge of said blade substantially parallel to said axis of rotation; the presser foot is suspended from the rotatable platform with the reciprocating knife blade extending through the opening in the foot; and said tamping means is also suspended from said rotatable platform with one portion of said tamping surface on the pad located adjacent said presser foot and on a line extending through the leading and trailing edges of said knife blade.

8. Apparatus for cutting as defined in claim 7 wherein a reciprocating drive linkage extending parallel to said axis of rotation and an associated drive motor are mounted on said rotatable support platform; and said knife blade and said tamping pad are both connected to said drive linkage for reciprocation parallel to said axis of rotation.

9. Apparatus for cutting as defined in claim 7 wherein a first drive motor is mounted on said rotatable support platform and connected to drive said reciprocating knife blade; and a second drive motor is mounted on the rotatable support platform and connected to drive said tamping pad.

10. Apparatus for cutting as defined in claim 7 wherein said tamping pad is an annular member suspended from said rotatable support platform and circumscribing said presser foot said reciprocating knife blade and said axis of rotation.

11. Apparatus for cutting as defined in claim 7 wherein said tamping pad comprises a reciprocating pad suspended from said rotatable support platform adjacent said presser foot at the trailing edge of said knife blade.

* * * * *